L. L. SWENSON.
NUT LOCK.
APPLICATION FILED FEB. 13, 1911.
1,013,521.
Patented Jan. 2, 1912.
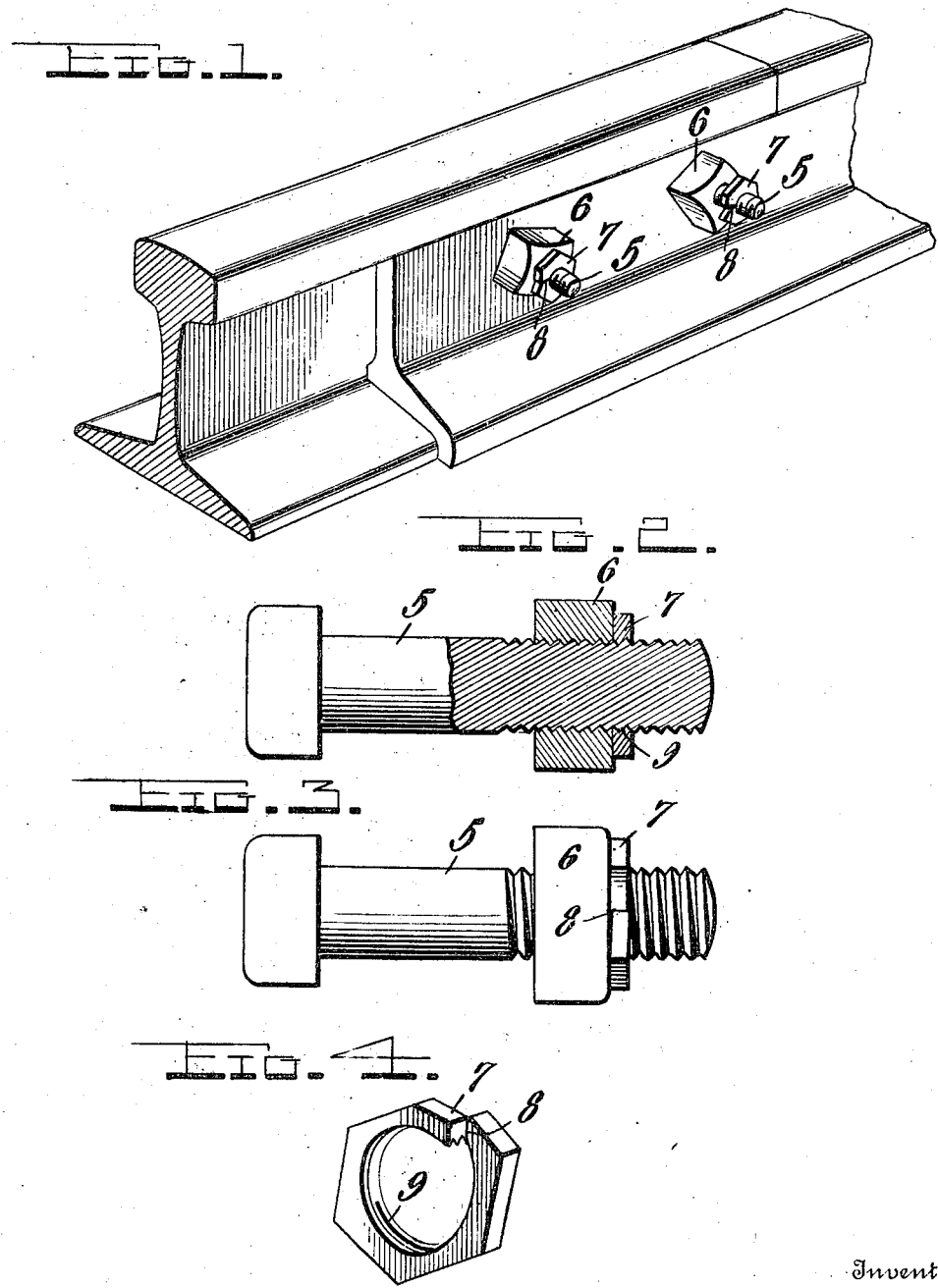
Witnesses
Chas. L. Grieshaver.
L. G. Ellis.
Inventor
Luther L. Swenson,
By Watson E. Coleman
Attorney

UNITED STATES PATENT OFFICE.

LUTHER L. SWENSON, OF OTTUMWA, IOWA.

NUT-LOCK.

1,013,521.  Specification of Letters Patent.  Patented Jan. 2, 1912.

Application filed February 13, 1911. Serial No. 608,300.

*To all whom it may concern:*

Be it known that I, LUTHER L. SWENSON, a citizen of the United States, residing at Ottumwa, in the county of Wapello and State of Iowa, have invented certain new and useful Improvements in Nut-Locks, of which the following is a specification, reference being had to the accompanying drawings.

This invention relates to nut locks and has for its object to provide a simple, effective, durable and extremely inexpensive device of this character whereby the nut may be quickly and securely locked upon the bolt.

A further object of the invention resides in the provision of a nut locking device consisting of a split nut provided with threads for engagement with the bolt threads, said lock nut being adapted for binding engagement upon the face of the nut whereby the threads thereof are caused to bind against the bolt threads, and prevent any turning movement of the nut upon the bolt.

With these and other objects in view, the invention consists of the novel features of construction and the combination and arrangement of parts hereinafter fully described and claimed, and illustrated in the accompanying drawings in which—

Figure 1 is a perspective view of a nut lock embodying my improvements showing one of the uses to which the device can be put. Fig. 2 is a longitudinal section. Fig. 3 is a side elevation showing the locking nut in its operative position against the face of the nut, and Fig. 4 is a detail perspective view of the locking nut.

Referring in detail to the drawing, 5 designates the threaded bolt and 6 the nut engaged thereon.

7 indicates the locking nut which is in the form of a ring or annulus split as indicated at 8, and having its abutting ends spread apart or disposed out of alinement as clearly shown in Fig. 4. This nut is provided with interior threads 9 for engagement with the threads of the bolt and is of octagonal or any other desired polygonal form so that a wrench may be readily applied thereto. Normally the interior threads of the locking nut are properly alined at the ends thereof, so that said nut may be easily and quickly threaded upon the bolt shank. After the nut 6 has been threaded upon the shank into engagement with the object through which the bolt is disposed, the locking nut is then adjusted and forced into binding engagement against the outer face of the nut. The wrench is now applied to the nut 7 and the same is turned upon the bolt, such turning movement forcing the separated ends of the locking nut into alinement and spreading the threads thereof so that they bind closely against the threads of the bolt shank, and thus absolutely prevent any turning movement of the nut 6 whereby the parts held by the bolt would be loosened.

In Fig. 1 of the drawings I have shown an application of the device wherein the bolt is disposed through the web of a rail and the fish plates thereof, but it will be obvious that my improved locking device may be used in all instances where a reliable and secure lock for the nut is desired. The locking nut is twisted to a sufficient extent before the threads are provided therein, so as to insure the desired binding action of the threads thereof with the bolt threads, when the nut is adjusted to its locking position.

From the foregoing it is believed that the construction and operation of my improved nut lock will be readily understood. The same is extremely simple and inexpensive to manufacture while at the same time a highly efficient and reliable device of this character is provided.

The locking nut 7 is preferably formed from hardened steel which is tempered to render the same resilient. Thus when the locking nut is tightened up against the face of the nut 6, it will have a tendency to assume its original shape, thereby causing the threads of the bolt and washer to bind and securely lock the nut in position on the bolt.

I claim:—

The combination with a threaded bolt and a nut engaged thereon, of a polygonal-shaped split locking nut of spiral form, the opposed end portions of said nut being normally disposed in different planes, the opposed faces of said separated end portions of the nut being radially disposed with respect to the bolt, said nut having interior screw threads for engagement with the threads of said bolt, the threads of said locking nut at one of the separated ends thereof engaging threads on the bolt adjacent to those engaged by the other end of the locking nut, said locking nut being adapted to be threaded upon the bolt into binding engagement with the face of the bolt nut, the binding action upon one of the separated ends of the locking nut tending to force said separated ends of the locking nut into alinement and binding the threads of said locking nut at their opposed end portions upon the bolt threads, substantially as and for the purpose specified.

In testimony whereof I hereunto affix my signature in the presence of two witnesses.

LUTHER L. SWENSON.

Witnesses:
H. C. JOHNSON,
K. BAKER.